Sept. 1, 1925.

C. T. LUTHY 1,551,675

CHECK BOOK STUB PAGE

Original Filed April 8, 1920

Charles T. Luthy

Inventor

Patented Sept. 1, 1925.

1,551,675

UNITED STATES PATENT OFFICE.

CHARLES T. LUTHY, OF PEORIA, ILLINOIS.

CHECK-BOOK STUB PAGE.

Continuation of application Serial No. 372,129, filed April 8, 1920. This application filed July 28, 1924. Serial No. 728,701.

*To all whom it may concern:*

Be it known that I, CHARLES T. LUTHY, a citizen of the United States, residing in the city of Peoria, State of Illinois, have invented certain new and useful Improvements in a Check-Book Stub Page, of which the following is a clear, full, and accurate description, reference being had to the accompanying drawings.

This invention has reference to new and improved features in the lines, spaces, money columns and indicia on the check stub, and in their arrangement, by which the stub better serves the dual purpose for the original record of the check data and for keeping on it a brief auxiliary bank account to guard against overdrafts.

Such features consist, specifically: in the stub having vertical lines defining a single money column (A) in the drawing, and a series of complete groups of horizontal check data lines (B) immediately at the left of the money column, said series and said column each extending from the top to the bottom of the stub, the uppermost line in the uppermost group being above a designated space (C) for deposit data; in the stub having the words "Balance in bank" (D) at its top and at its bottom immediately at the left of the money column; in the lines of each group (E) above the lowest line, which is the amount-of-check line, being spaced from the money column the number-of-check and date lines being in the upper left hand corner; and in the lowest line in the lowermost group being continued through the money column (F) as a totaling line for summing up the checks and as the line under the subtrahend on substracting said sum from the amount in bank.

The improvements effected by said features are as follows: The single money column (A) places both the total in bank and the total of the checks in the same money column; this saves having to transfer either of said totals to another column when computing the balance in bank; it places said total-figures in vertical, denominational alignment; this avoids making the errors that adding or subtracting deposits or checks, respectively, to or from the amount in bank in another column, tend to make. The serial grouping of the check data (B) immediately to the left of the single money column automatically places the total of the checks in its logical position in the money column below the amount in bank so that said total can be subtracted from the total in bank at one computation; this saves making unnecessary figures and computations that subtracting the checks one by one requires: and it automatically brings the remainder in its logical position in the bottom of the money column as the balance left in bank after the transactions on the page. The so positioning the deposit space (C) automatically places the deposits in their logical position in the top of the money column immediately below the balance in bank with which the page starts so that all the deposits can be added to said balance at one computation; this also saves the making of unnecessary figures and computations that adding the deposits one by one requires and essentially helps to make the arrangement an integral, auxiliary bank account system. The words "Balance in bank" (D) at the top and bottom of the page indicate, as a matter of fact, that the figures following said words represent the balances in bank, respectively, before and after the transactions on said page. The word "Balance," alone, is not specific—does not necessarily mean in bank. The so positioning the number-of-check and date lines in the upper left hand corner of the groups, and the so shortening said lines and spacing the lines in the groups (E) above the amount-of-check lines away from the money column, and extending the amount-of-check lines to the money column, sets the figures upon the latter lines in a columnar space away from other figures in the groups; this averts the tendency, when summing up the checks of adding in other figures in the group with the amount-of-check figures; and extending the amount-of-check line to the money column indicates that the figures on said line are the amount of the check and are to be carried into the money column. The continuation of the lowermost amount-of-check line on the page (F) through the money column inserts the totaling line for summing up the checks, and indicates that the several checks are to be summed up and their total inserted on said line; and said line also serves as the line under the subtrahend on substracting the total of the checks from the total in bank and thereby places the remainder, as the balance left in bank after the transactions on the page, in its logical position in the bottom of the money column. The whole arrangement is simple, concise, convenient, labor-saving and error avoiding, and, as the stub is only printed on one side and the setting is simple, the stub is economical.

Applicant claims as follows:

1. A check stub having vertical lines defining a money column, and a series of groups of horizontal check data lines at the left of the money column, said series and said column each extending from the top to the bottom of the stub, the top horizontal line in the uppermost group being immediately above a designated space for deposit data.

2. A check stub having at its right vertical lines defining a single money column, and a series of groups of horizontal check-data lines immediately to the left of said money column, said series and said column each extending from the top to the bottom of the stub, the lines of each group above its lowest line being spaced from the said money column to form an open vertical space, the lowest line being the amount-of-check line and extending through said space to the money column.

3. A check stub having at its right vertical lines defining a single money column, and a series of groups of horizontal check-data lines immediately to the left of said money column, said series and said column each extending from the top to the bottom of the stub, the amount-of-check line in the lowermost group being the lowermost line on the stub and extending through said money column as a totaling line for summing up the checks and as the line under the subtrahend on subtracting said sum from the amount in bank.

4. A check stub having vertical lines defining a money column, and a series of groups of horizontal check data lines at the left of the money column, said series and said column each extending from the top to the bottom of the stub, the lines of each group above its lowest line being spaced from the money column to form an open vertical space, the lowest line being the amount-of-check line and intersecting said open vertical space and in the lowermost group being continued through the money column, the number-of-check line being in the upper left hand corner of each group and in the uppermost group being immediately above a designated space for deposit data, and the stub also having the words "Balance in bank" both at its top and at its bottom and immediately at the left of the money column.

Signed at Peoria, in the county of Peoria and State of Illinois, this 3rd day of March, 1925.

CHARLES T. LUTHY.